United States Patent Office 3,051,418
Patented Aug. 28, 1962

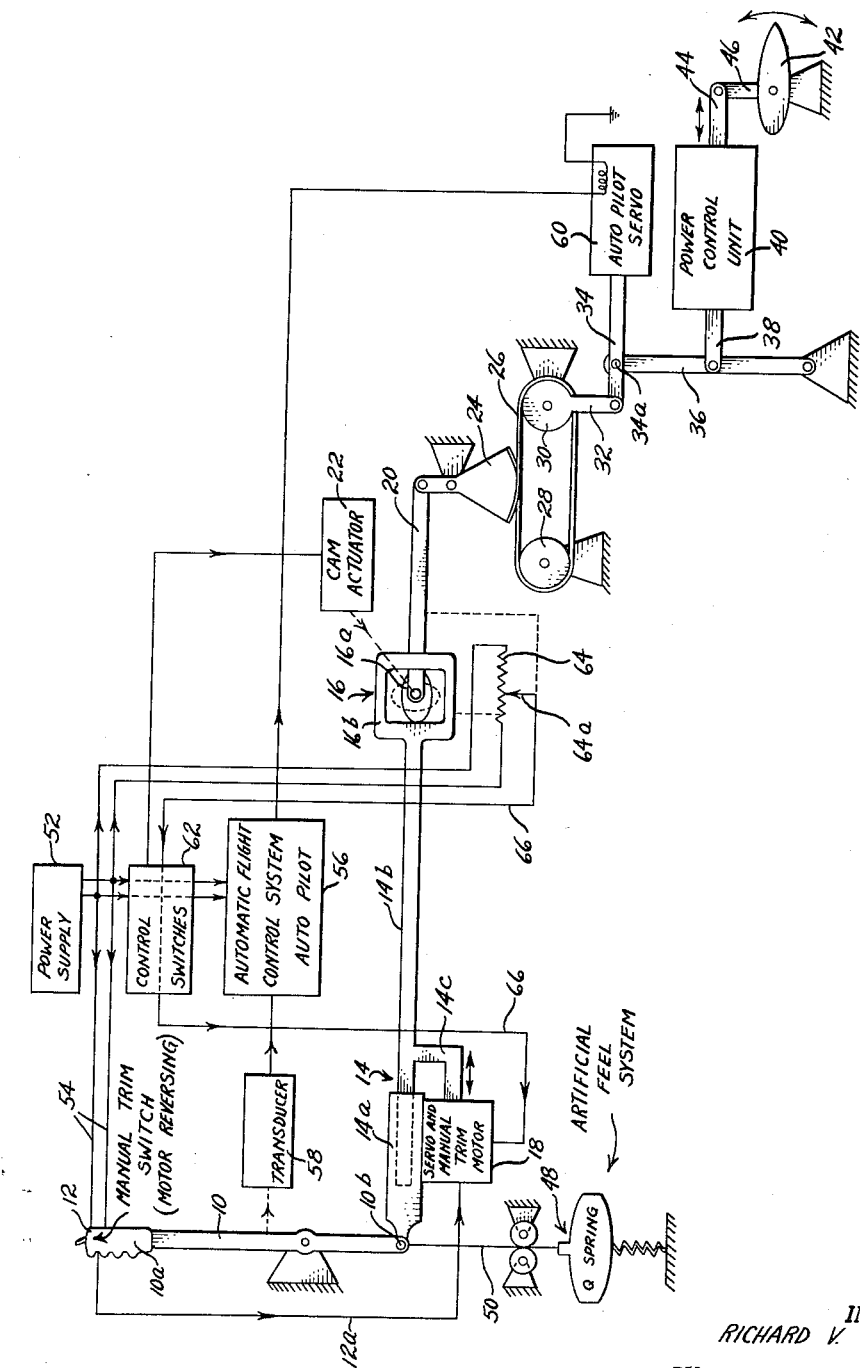

3,051,418
FLIGHT CONTROL SYSTEM
Richard V. Ramsey, Wichita, Kans., assignor to Boeing Airplane Company, Seattle, Wash., a corporation of Delaware
Filed Sept. 27, 1960, Ser. No. 58,719
11 Claims. (Cl. 244—83)

This invention relates to improvements in flight control systems for high-performance aircraft. In particular, it concerns those systems wherein a direct-actuating manual flight control mechanism is provided in standby relation to an autopilot, both subject in turn to operation by the same control stick or other control member. The invention is herein illustratively described by reference to the presently preferred form thereof; however, it will be recognized that certain modifications and changes therein with respect to details may be made without departing from the essential features involved.

In transonic and supersonic aircraft it is common to provide "control stick steering," an autopilot system operable to convert the manual command (viz., force applied to the control stick) into optimized response of the elevator or other flight control surface. However, in the usual systems certain conditions exist which tend to defeat the basic purposes of control stick steering. These arise primarily from the fact that the control stick is permitted to reflect control surface position. With the wide range of elevator effectiveness and trim positions normally encountered in high-performance aircraft, such reactionary control stick movements can be highly confusing to the pilot, who may oppose them unwisely. This confusion may be understood by noting that the pilot causes control surface movement to occur in the first instance by the force which he applies to the stick and not by his positioning of the stick, yet he is confronted with an unrelated movement of the stick resulting from the response of the autopilot and the mechanical motion feedback to the stick through the direct manual connection system. Moreover, should the autopilot become disengaged and the control be returned to direct manual control when the airplane is flying at high speeds, especially if such transition occurs inadvertently or when the pilot is unprepared for it, a sharp transient is virtually inevitable. This latter problem has not been overcome by former proposals of disconnect mechanisms interposed in the direct-actuating flight control linkage of an aircraft, which could prevent mechanical motion feedback to the control stick during control stick steering.

An object of this invention is to overcome both of the aforementioned difficulties in systems of the described type. In particular it is an object to assure a smooth transition between manual control and autopilot or control stick steering control; also to eliminate mechanical motion feedback to the stick during autopilot control.

A specific object and distinguishing characteristic of this invention is the provision of manual control system trimming mechanism operable automatically during control stick (autopilot) steering operation in order to maintain the manual control system always ready for a smooth transition back to manual control despite isolation of the control stick from control surface movements while operating in the automatic mode, and further operable at will by the pilot for trim purposes with the system on direct manual control so that immediately after the transition back to manual control the pilot is enabled to move the stick to that position which properly reflects control surface position, and to do so without disturbing control surface position or introducing undesired transients.

Such objects and purposes are attainable according to this invention as presently disclosed by incorporating serially in the linkage of the direct-actuation manual control automatic trim control means comprising a variably extensible and contractable connection, a lost-motion decoupling and caging device having relatively movable but interlockable parts, and servo means operable to vary the effective length of such variable connection either during the automatic mode in response to relative movement occurring between the caging device parts and in such manner as to oppose and limit such relative movement, or during the direct manual control mode in response to the pilot's operation of a trim control switch or other actuator operable at will to vary the trim position.

It will be understood that references herein to a "manual" or "direct-actuation" control mechanism, or similar terms, do not necessarily require a strictly mechanical coupling from the control stick all the way through to the control surface; in fact, it is usual to employ an intervening servomechanism or power boost. The intent of such terminology is primarily to distinguish the relatively direct control which the pilot may exercise in the manual mode from the modified control which the autopilot or automatic control exercises when the pilot is operating the control stick with the system in the control stick steering mode.

These and other features, objects and advantages of the invention will become more fully evident from the following description of its presently preferred embodiment as shown in the accompanying schematic diagram of the novel system.

In the drawing, control stick 10 comprises a rocking lever provided with a handle 10a on which a manual trim switch 12 is mounted. At the opposite end of the control stick is a pivotal connection 10b to one end of an expansible and contractable link 14, the opposite end of which is connected to or forms part of a lost-motion and caging mechanism 16. The variable link 14 comprises the two mutually telescoping members 14a and 14b. A reversible motor 18 bodily mounted on the member 14a has an output or drive connection operatively connected to link member 14b, such as through the rigid side arm 14c thereof, in order to extend or contract the link members 14a and 14b relatively by energization of the motor to operate in one direction or the other.

The lost-motion and caging mechanism 16 comprises a captive cam 16a pivotally mounted on one end of the coupling link 20 and movably retained within the cage member 16b so as to permit relative motion between the cam and the member 16b lengthwise of the links 14b and 20 when the cam is in its rotated position shown by dotted lines (i.e., out of engagement with the member 16b) and so as to interlock the cam with the member 16b when the cam is rotated into its solid-line position shown. A cam actuator 22 rotates the cam between positions. With the parts 16a and 16b interlocked, the two links 16b and 20 are rigidly interconnected.

The opposite end of link 20 is connected to an actuating quadrant 24 which, through a coupling of such quadrant to the cable 26 which extends around sheaves 28 and 30, causes swinging of the sheave-mounted control arm 32. The control arm 32 is connected to an operating link or rod 34 which, in turn, is pivotally connected at 34a to the control lever 36 which actuates the control rod 38 for the power control unit 40. The power control unit 40 comprises a power boost device which operates the aircraft control surface 42 through a coupling link 44 and arm 46, or equivalent mechanism.

When the system is on manual or direct-actuation control, operating movement of the control stick 10 effects longitudinal displacement of the linkage 14–20 in order to operate the power control unit 40 through a direct mechanical coupling system. Artificial feel is introduced at the control stick in the usual manner, that is, by means of the "Q" spring mechanism 48 connected to the lower end of the stick through the cable 50. In the manual mode the lost-motion and caging mechanism parts 16a and 16b are interlocked and the motor 18 is in a non-energized state, so that the link parts 14a and 14b are immovable relatively.

While the link parts 14a and 14b are relatively immovable during control stick operation, so that movements of the stick are reflected directly in corresponding movements of the control surface 42, provision is made for trimming the control surface in order to establish the desired positional relationship between the control surface and the stick at any time regardless of the relationship therebetween which existed when the system was initially placed on manual control. Such a means comprises the reversible motor 18 and its associated link-actuating arm 14c, and a manual trim switch 12 mounted on the stick and operable through the connection 12a to energize the motor with one polarity or the other for effecting its reversal or for deenergizing the motor, the switch 12 being a three-position reversing switch which is connected to the output of the power supply 52 through the leads 54.

For purposes of control stick steering in the automatic mode, coordinated with the manual mode in accordance with this invention, the apparatus includes an automatic flight control system (autopilot) 56 arranged to be actuated or controlled by a force transducer 58 interposed between the stick 10 and the input of the autopilot. The arrangement is such that force applied to the control stick 10 produces a corresponding electrical signal applied to the autopilot, which signal is translated into an optimized command signal or output for energizing the autopilot servo 60 in order to displace the control link 34 correspondingly. Such displacement of the control link operates the power control unit 40 in order to displace the control surface 42 in the usual manner. Because force on the control stick, acting in turn on the force transducer 58, is the controlling influence by which the control surface is displaced in the automatic mode, position of the control stick under these conditions bears no necessary relationship to the position of the control surface. Consequently, direct mechanical-motion feedback from the control surface to the control stick would produce serious problems as previously discussed. For this reason, the caging mechanism parts 16a and 16b are released from each other through energization of the cam actuator 22 during the automatic mode of operation. Operation of master control switches in the unit 62 by which the autopilot is energized and deenergized produces coordinated energization and deenergization of the cam actuator 22 to that end.

In addition, with the coupling parts 16a and 16b disengaged in the automatic mode, there is provided a servo means by which the mechanical or direct-actuation portion of the system is kept in constant standby relation to the automatic portion of the total system, so that when the system returns to the mechanical or manual mode there will be no transient and the pilot may take up directly where the autopilot has left off, wihout loss of continuity in the control of the aircraft. For this purpose there is mounted on the coupling member 16b a protentiometer winding 64 the terminals of which are energized from the power supply 52. The potentiometer wiper 64a is physically moved by the link 20 (i.e., by longitudinal displacement of the cam 16a relative to the caging member 16b) and is electrically connected to the input of the servo and manual trim motor 18, through the control switch unit 62 and the coupling lead 66. When the system is placed in the automatic mode by operation of the control switch unit 62, the servo and manual trim motor 18 is subject to control energization by changes in position of the potentiometer wiper 64a relative to the winding 64 so as to cause the motor 18 to extend and contract the linkage 14 in accordance with relative movement occurring between the links 20 and 14b. The polarities in the energizing circuit for the motor 18 are such that the longitudinal displacement permitted between the lost-motion parts 16a and 16b is limited to a small value, as a result of the follow-up action provided by the potentiometer 64, 64a and servometer 18.

With such a system it will be evident that when the operation is restored from the automatic mode to the manual mode, either at will or inadvertently, the lost-motion coupling parts 16a and 16b instantly interlock and establish a rigid drive connection between the control stick 10 and the operating rod 38 of the power boost 40, so that the control surface 42 is instantly positionally tied to the stick 10. The position of the control surface 42 in relation to that of the stick, however, may not be in the desired trim position for reasons previously explained. Trim is restored or established, however, by the simple process of actuating the manual trim switch 12 to either of its two operating positions in order to energize the motor 18 for purposes of extending or contracting the telescope link 14 so as to place the control surface 42 in trim with the control stick in its desired base or neutral position.

On the other hand, when the system is restored to the automatic mode from the manual mode, effected simply by manual operation of the control switch unit 62, the cam actuator is energized in order to move the cam 16a into the dotted line position and thereby decouple the cam from the caging member 16b, so that positioning of the stick 10 no longer directly determines positioning of the control surface 42. Instead the control surface is positioned in an optimized manner by the force which the pilot applies to the stick 10, which force the autopilot, with its input transducer 58, converts into the desired optimized response which takes into consideration the speed of the aircraft, the allowable stresses in its parts caused by maneuvers, and similar factors.

It will be noted that the ratio of control stick displacement relative to autopilot servo displacement will vary considerably, so that the links 20 and 14b will not move at the same rate or in the same amount in the automatic mode; nevertheless, the operation of trim motor 18 operating the linkage 14 compensates for this difference. At the same time, the follow-up action of the motor 18 energized by potentiometer 64, 64a prevents any direct mechanical motion feedback from the autopilot servo to the stick 10, which the pilot might oppose unwisely.

At any time the autopilot is disengaged, either intentionally or inadvertently, the cam mechanism 16a, 16b relocks and the servomotor 18 stops, thus rendering the link 14 again a rigid unit. Neither the stick nor the control surface is moved by this action since the stick force felt by the pilot does not change, nor is any mechanical motion imparted to the power control unit 40 until the pilot moves the stick. Manual control is thus restored and the servomotor 18 now functions only by operation of the trim control switch 12. Actuator 22 may, of course, be operated in any other suitable manner to the end of relocking the parts 16a and 16b when the autopilot becomes inoperative.

These and other aspects of the invention will be evident to those skilled in the art based on the foregoing description of the presently preferred embodiment thereof.

I claim as my invention:

1. A flight control system comprising, in combination with a flight control surface, a first means to actuate said surface, a second means to actuate said surface including a manually operable control member and a connecting mechanism between said surface and said control member, said mechanism including a disengageable coupling having relatively movable parts engaged during manually controlled actuation of the surface by said second means and disengaged during actuation of the surface by said first means, said mechanism further including a variable-length connecting device therein interconnecting said control member and said coupling, and servomechanism responsive to relative movement between said parts effected by the first means and operable thereby to vary the effective length of said connecting device in response to such latter movement for limiting relative displacement between said parts with said control member remaining substantially unmoved.

2. The flight control system as in claim 1, and trim control means operatively connected to said variable-length connecting device and operable at will to vary the effective length thereof independently of operation of said control member.

3. The flight control system defined in claim 1, wherein the first means comprises an automatic flight control system.

4. A flight control system comprising, in combination with a flight control surface, a first means to actuate said surface, a second means to actuate said surface including a manually operable control member and a connecting mechanism between said surface and said control member, said mechanism including a variable length connecting device therein interconnecting said control member and said surface, and servomechanism including a transducer responsive to control surface actuation effected by the first means and a servomotor connected to the connecting device and controlled by the transducer to vary the length of said connecting device.

5. The flight control system as in claim 4, and trim control means operatively connected to said variable-length connecting device and operable at will to vary the effective length thereof independently of operation of said control member.

6. The flight control system as in claim 5, wherein the first means comprises an automatic flight control system, including input transducer means actuated by the control member and operatively connected to said automatic flight control system to apply control signals thereto for actuating the flight control system at will manually through the automatic flight control system.

7. A flight control system comprising, in combination with a flight control surface, a first means to actuate said surface, a second means to actuate said surface including a manually operable control member and a connecting mechanism between said surface and said control member, said mechanism including a lost-motion coupling having normally relatively movable parts which are locked together for conjoint movement during manually controlled actuation of the surface by said second means and unlocked during actuation of the surface by said first means, said mechanism further including a variable-length connecting device therein interconnecting said control member and said coupling, and servomechanism responsive to control surface actuation effected by the first means and operable thereby to vary the effective length of said connecting device with said control member remaining substantially unmoved.

8. A flight control system comprising, in combination with a flight control surface, a first means to actuate said surface, a second means to actuate said surface including a manually operable control member and a connecting mechanism between said surface and said control member, said mechanism including a disengageable coupling having relatively movable parts engaged during manually controlled actuation of the surface by said second means and disengaged during actuation of the surface by said first means, said mechanism further including a variable-length connecting device therein interconnecting said control member and said surface, and trim control means operatively connected to said variable-length connecting device and operable at will to vary the effective length thereof independently of operation of said control member.

9. A flight control system comprising a flight control surface, automatic flight control means operatively connected to said surface to actuate the same, a manually operable control member, mechanism connecting said control member to the surface for actuating the same by manually produced movement of said member, said mechanism including serially therein a lost-motion caging mechanism having lockable but normally relatively movable parts and a connecting link of variable length, servomechanism operable to vary the length of said link responsively to movement of the control surface effected by said automatic flight control means, and means operable to render said automatic flight control means inoperative and simultaneously to lock said caging mechanism parts together.

10. The system defined in claim 9, and trim control means operable at will to vary the length of said link with the automatic flight control means rendered inoperative.

11. A flight control system comprising, in combination with a control surface and actuator therefor, a primary control mechanism operatively connected to said actuator for operating the same normally during flight and including a manually operable control member and a flight control means operated by force applied to said control member and converting such force into predetermined operation of said actuator for repositioning of the control surface, a standby control mechanism interconnecting said actuator and said control member, said standby control mechanism having interposed therein a normally disengaged lost-motion caging device and an extensible and contractable coupling, servo means responsive to repositioning of the control surface and operatively connected to said coupling to extend and contract the same correspondingly whereby said control member is effectively isolated from such repositioning movement of the surface, and trim control means operatively connected to said coupling to extend and contract the same at will independently of operation of the primary control mechanism.

References Cited in the file of this patent
UNITED STATES PATENTS
2,852,212    Mallery et al. _ _ _ _ _ _ _ _ _ _ Sept. 16, 1958